United States Patent
Miller

[11] Patent Number: 5,927,922
[45] Date of Patent: Jul. 27, 1999

[54] TACK, HAMMER TACKER THEREFOR, AND METHOD

[75] Inventor: David C. Miller, Spartanburg, S.C.

[73] Assignee: High Wind Products, Inc., Monett, Mo.

[21] Appl. No.: 09/020,012

[22] Filed: Feb. 6, 1998

Related U.S. Application Data

[60] Provisional application No. 60/039,971, Feb. 10, 1997.

[51] Int. Cl.$^6$ ..................................................... F16B 15/08
[52] U.S. Cl. ......................... 411/444; 411/442; 411/477; 206/343
[58] Field of Search ........................... 411/439, 442–444, 411/463, 464, 466, 467, 477; 206/343, 340

[56] References Cited

U.S. PATENT DOCUMENTS

| | | | |
|---|---|---|---|
| 1,087,580 | 2/1914 | Hamill | 411/477 |
| 1,380,738 | 6/1921 | Raeburn | 411/477 |
| 2,293,862 | 8/1942 | Sorenson | 411/442 |
| 2,940,081 | 6/1960 | Juilfs . | |
| 4,585,154 | 4/1986 | Fealey et al. | 227/109 |
| 4,815,910 | 3/1989 | Potucek | 411/444 |
| 4,858,812 | 8/1989 | Fealey | 227/116 |
| 5,000,365 | 3/1991 | Fealey | 227/130 |

Primary Examiner—Flemming Saether
Attorney, Agent, or Firm—Jonathan A. Bay

[57] ABSTRACT

A tack for holding soft thin membrane-like materials such as roof shingles, roofing felt, or house wrap is produced in collated strips from a stock of band sheet metal. Each tack has a head and a shank lanced out of the head and bent out to leave behind a slot in the head. The shank of a given tack nests within the slot of an adjacent tack in a side by side relationship for collating in strips for use in a tacker tool. The production of the collated strips of tacks includes a progressive punch press operation wherein the stock of band sheet metal is indexed incrementally therethrough in a given indexing direction. At the extreme end of the progressive punch press operation, a completed tack is advanced to and through a collating operation in a given collating direction. In one example, the indexing direction and collating direction are arranged 135° apart. The collating direction is generally co-axial with the alignment of the slot of the tacks as each is separated off the end of the stock band of sheet metal, such that, without rotating the tack, the shank of each tack can be nested in the slot of the preceding tack merely by advancing the tack in a straight line.

15 Claims, 10 Drawing Sheets

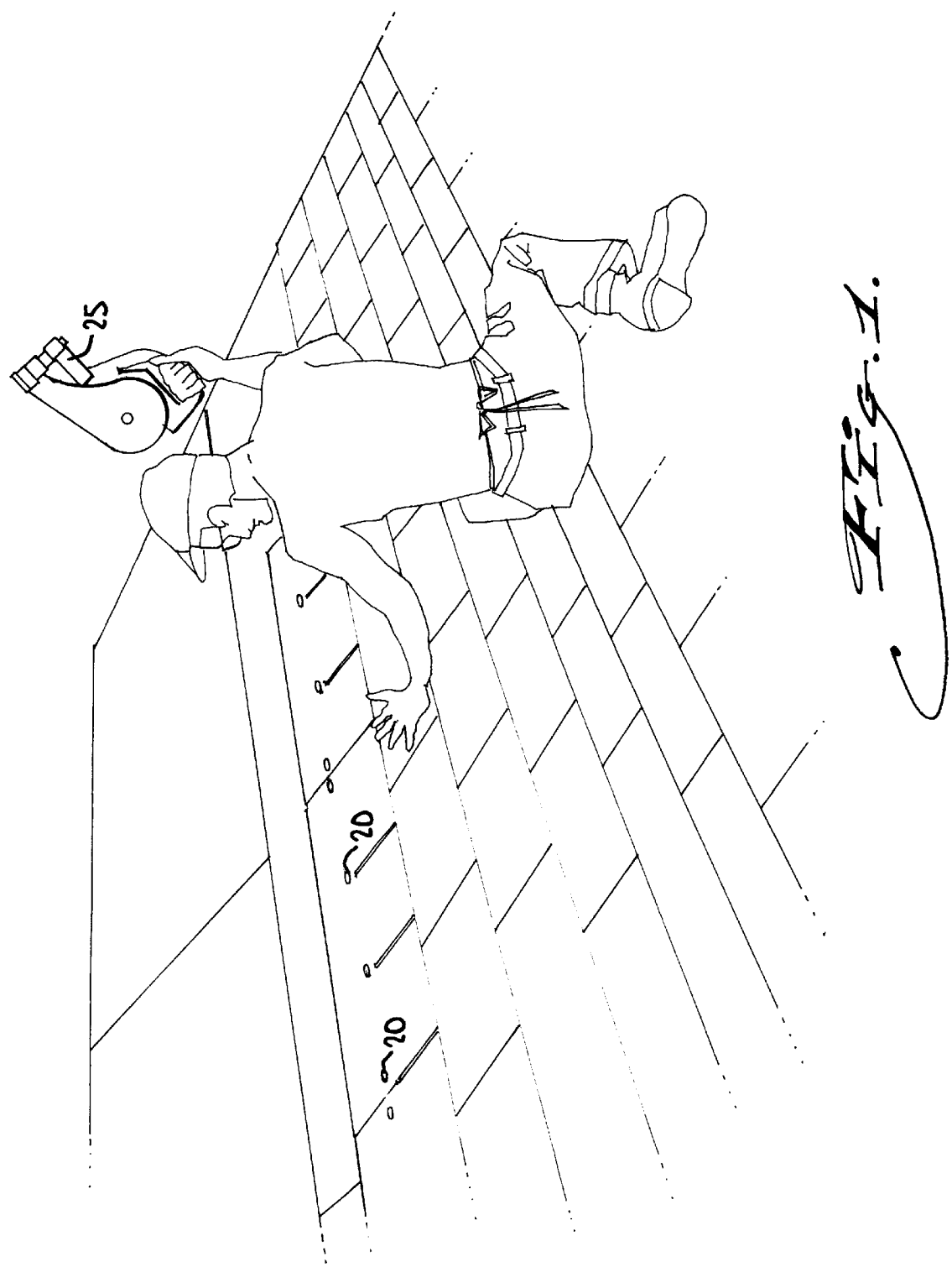

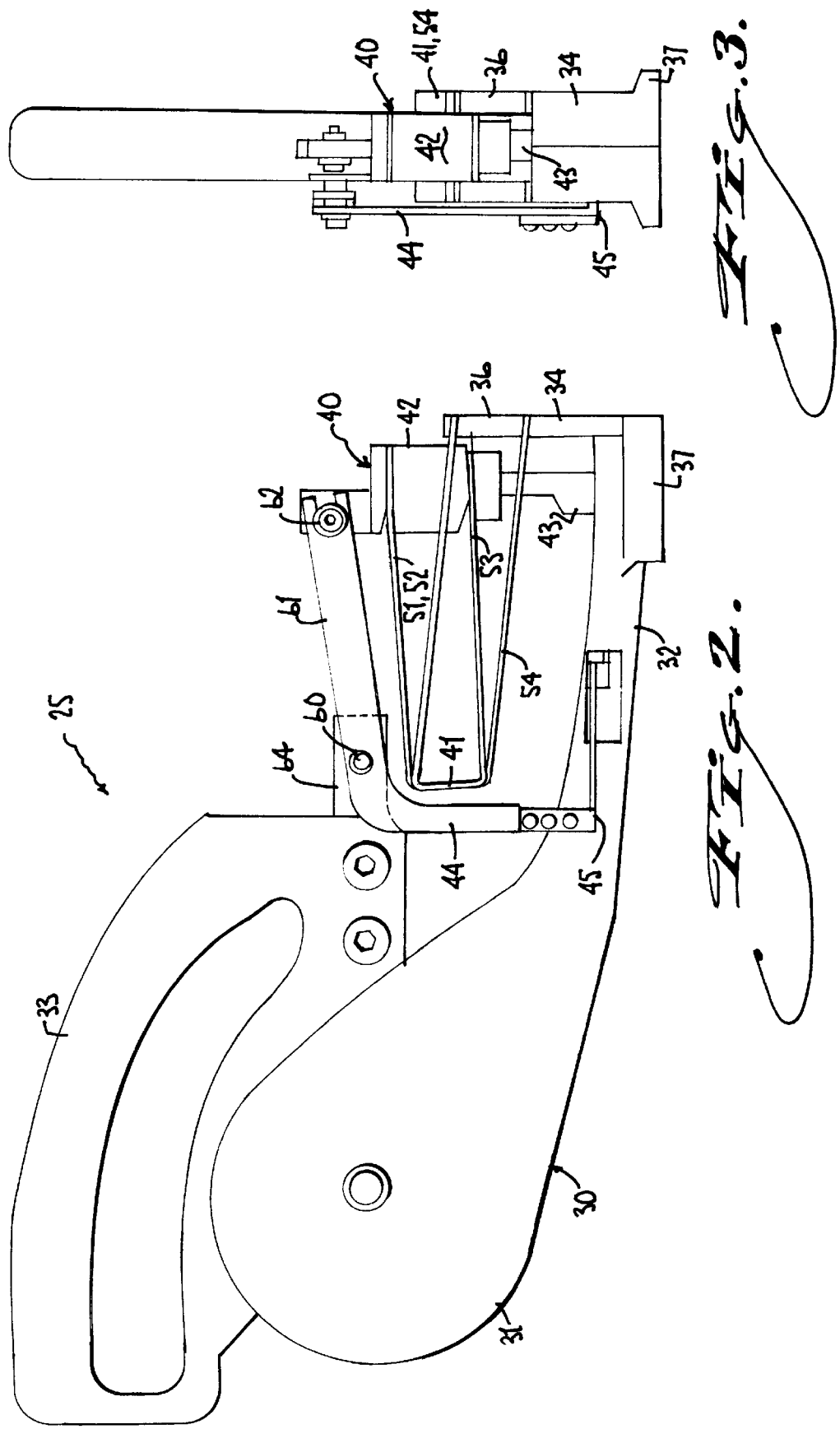

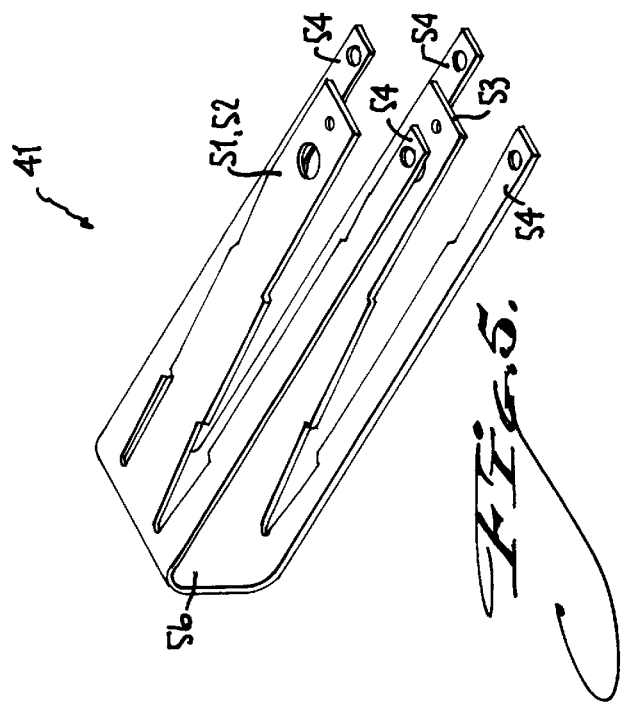
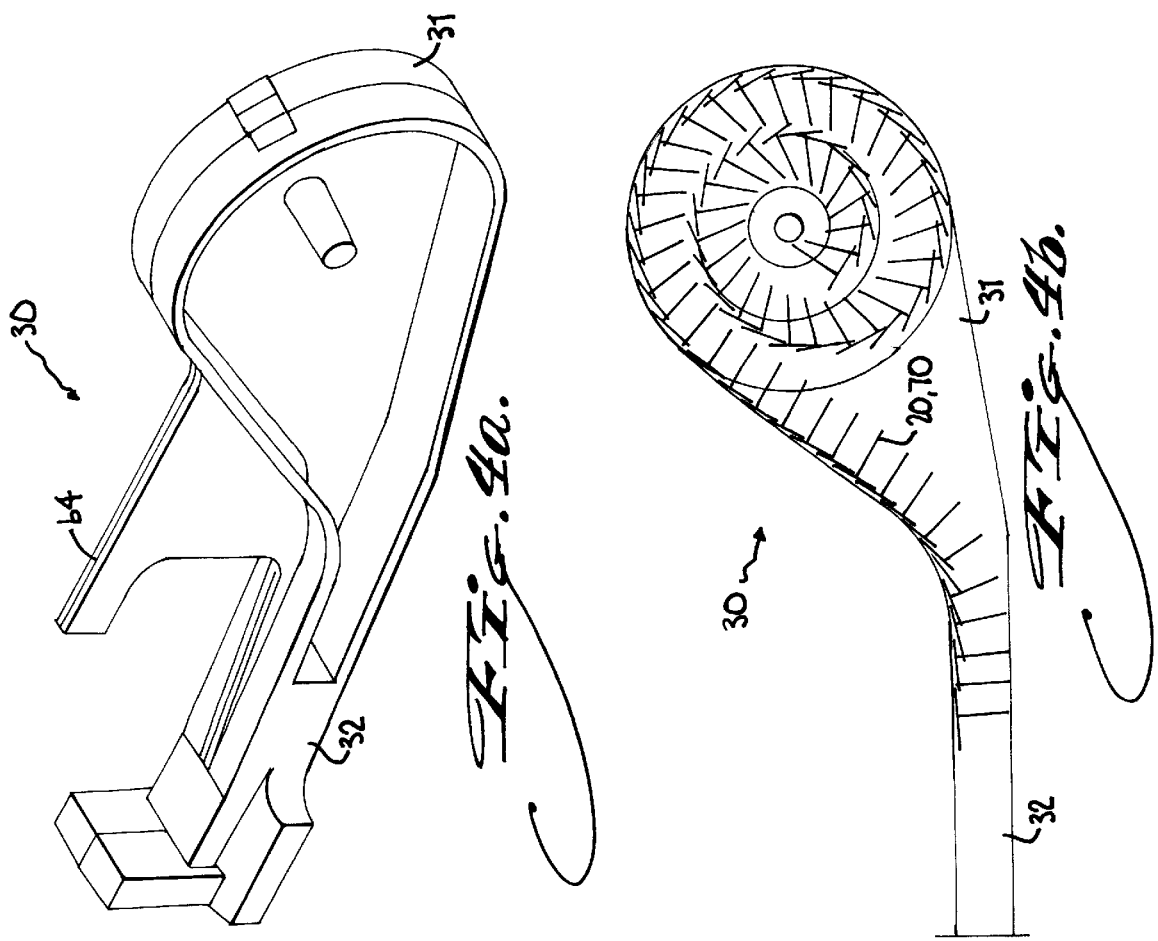

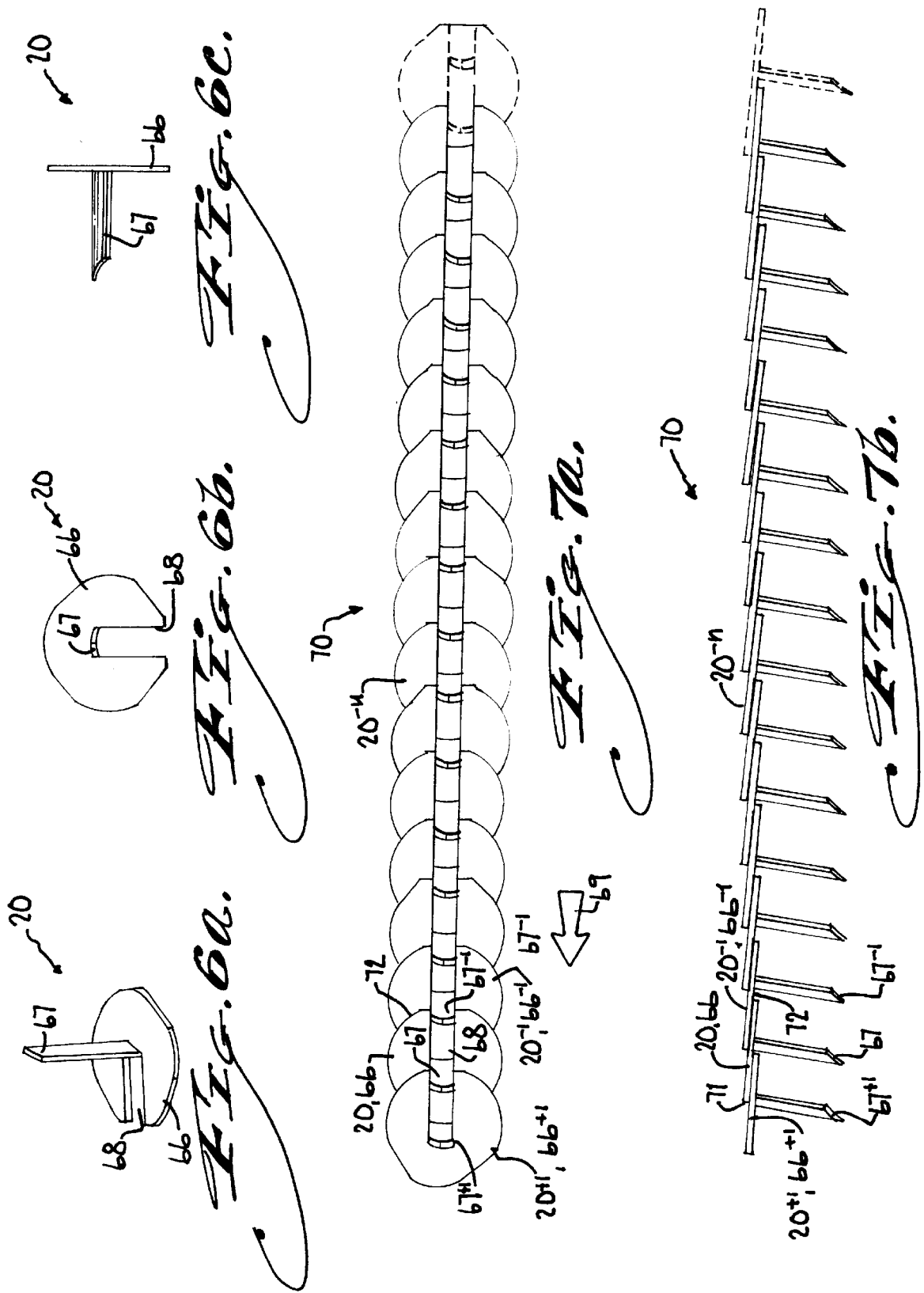

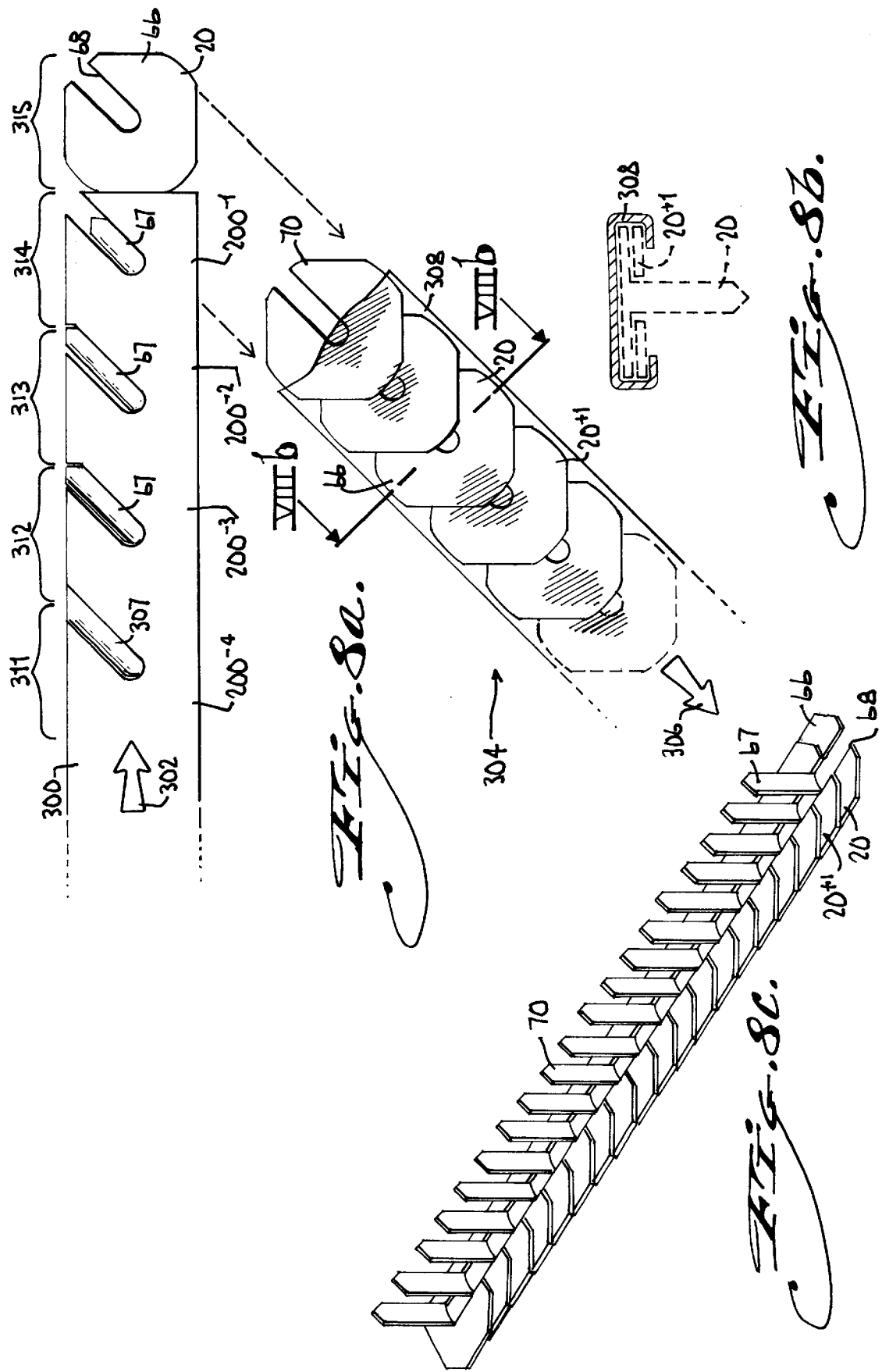

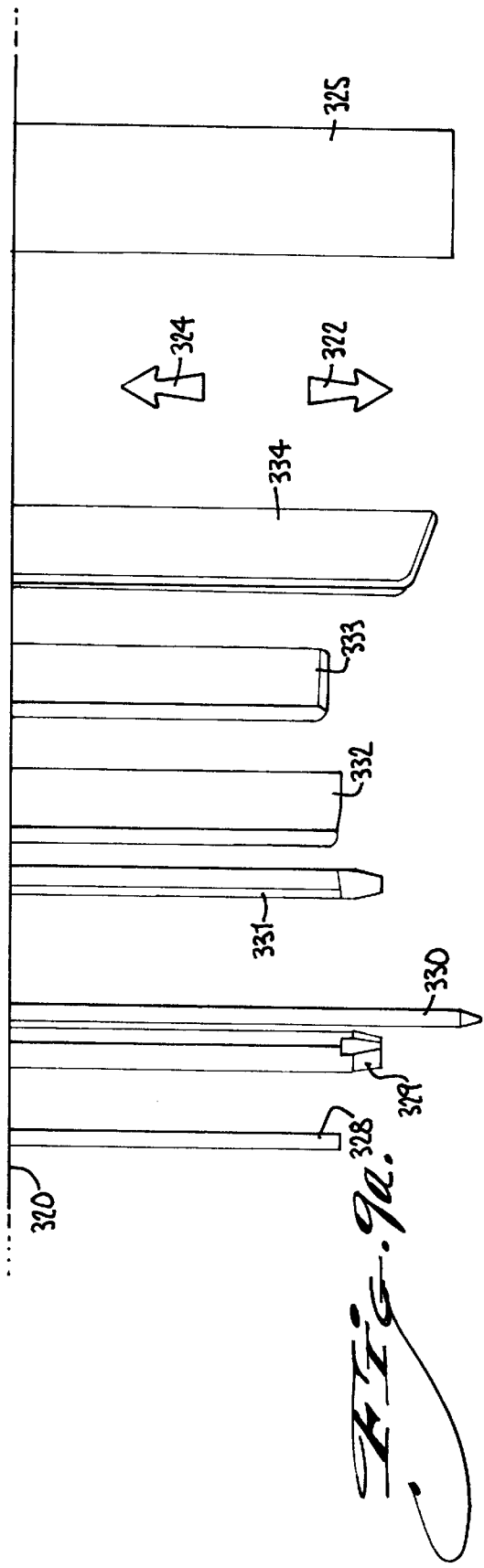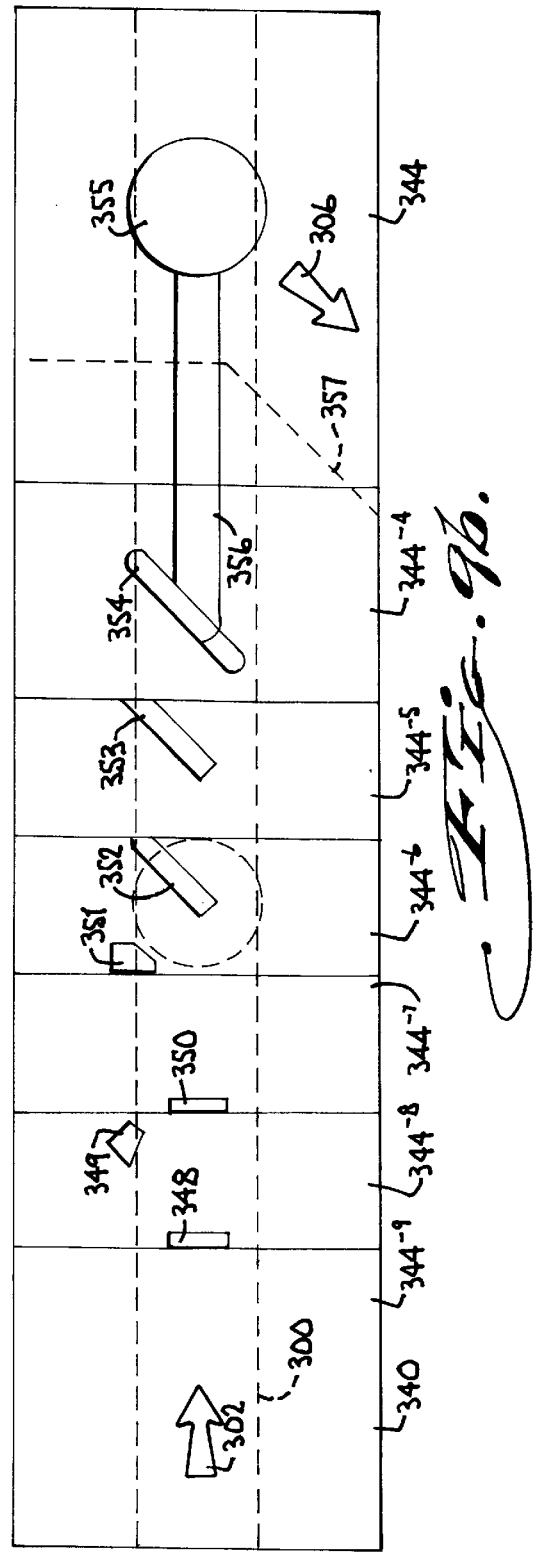

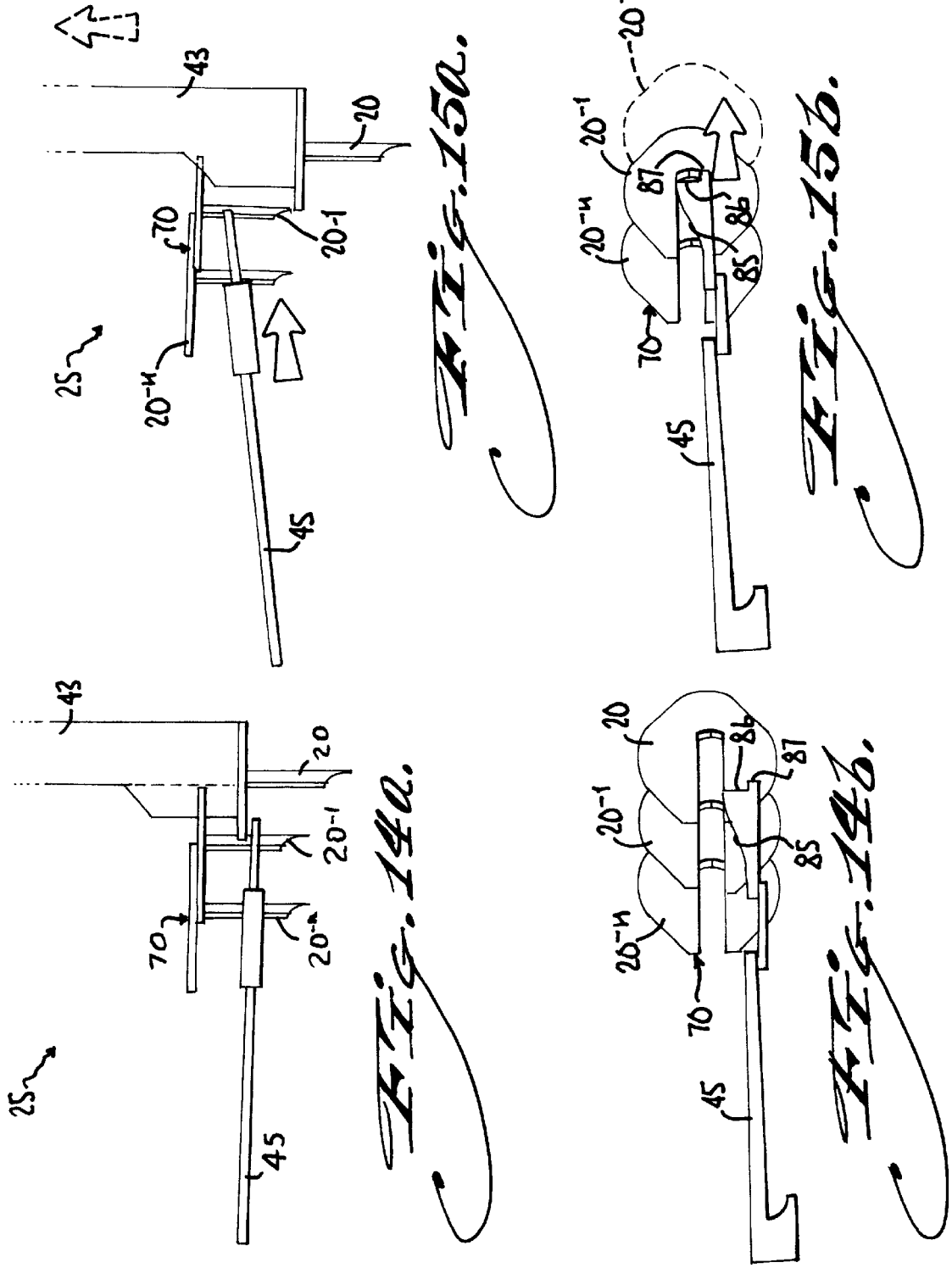

TACK, HAMMER TACKER THEREFOR, AND METHOD

CROSS-REFERENCE TO PROVISIONAL APPLICATION(S)

This application claims the benefit of U.S. Provisional Application No. 60/039,971, filed Feb. 10, 1997.

BACKGROUND AND SUMMARY OF THE INVENTION

The invention generally relates to fasteners as tacks, nails, staples and so on, as well as, a labor-saving hammer tacker for driving the fastener or tack in accordance with the invention, on a repetitive and highly efficient basis.

Rival or competitive products include pneumatic nailers or staple guns and the like. A pneumatic driver tool gives the promise of high productivity for a construction worker, say, for example, a roofer, who uses the tool to lay shingles. However, there are problems associated with the conventional pneumatic driver tool. The air hose (e.g., also termed the "umbilical cord") is heavy and awkward. Conventionally, the air hose typically extends from a compressor on the ground to the tool carried by the roofer on a roof maybe two or more stories above ground. The roofer must constantly fight the weight and awkwardness of the air hose while at the same time he or she is practicing vigilance not to fall off balance or off the roof. Also, in use, the air hose scrapes back and forth along the free edge of the first row of roof shingles, the row which overhangs the eaves. After the end of a roofing job, those shingles in the first row are often quite damaged.

Another problem with pneumatic nail guns is that, the nails or fasteners adapted for pneumatic nail guns characteristically have a relatively small head. In more technical language, such nail heads have relatively small surface areas. Small-surface area fasteners are not highly effective for attaching soft, thin, membrane materials to hard (typically wooden) structures or substrates. Examples of such materials include not only shingles as previously mentioned, but also roofing felts and house wraps or vapor barriers and the like. Roofers typically substitute conventional staple guns for the conventional pneumatic nailers to both eliminate the air hose and use a fastener effective for attaching soft, thin, membrane materials. However, there are other shortcomings associated with staples.

Staples, even heavy-duty staples, characteristically have legs prone to buckling. During a roofing job, for example, after every so many staples which plunge down correctly, one will go in defectively with a crippled leg buckling or crumpling. If not removed, the buckled leg creates a protrusion likely to wear through the immediately overlying shingle overlapping the one the crippled staple is driven through, and hence create a leak spot.

Overcoming the above shortcomings of the prior art and other aspects and objects are provided according to the invention in a tack having an especially broad flat head to provide a large surface area particularly effective for fastening soft, thin, membrane materials. An inventive aspect of the tack relates to how it is fabricated. The tack is preferably produced from light gauge (e.g., twenty to twenty-four gauge) sheet metal in a progressive die punch, the output of which is directly fed to a collating machine which interconnects the tacks in indefinitely long strips. In addition to the inventive tack, another aspect according to the invention includes a labor-saving hammer tacker for the inventive tacks. The inventive hammer tacker eliminates the air hose of conventional pneumatic tools without sacrificing high productivity performance in roofing and like construction jobs. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a roofer laying shingles to illustrate an example operative environment for tacks in accordance with the invention (several are shown installed), and an inventive hammer tacker therefor (also shown);

FIG. 2 is a side elevational view of the hammer tacker in FIG. 1;

FIG. 3 is front view thereof;

FIG. 4a is a perspective view of the main body of the hammer tacker;

FIG. 4b is a side view thereof showing it loaded with a coil of tacks;

FIG. 5 is a perspective view of a cantilevered leaf spring that is visible in the previous side view of the hammer tacker (i.e., FIG. 2);

FIGS. 6a through 6c are a series of views of one tack, in isolation, in accordance with the invention, wherein:

FIG. 6a is perspective view,

FIG. 6b is a plan view thereof, and,

FIG. 6c is a side view of FIG. 6b;

FIG. 7a is a plan view showing multiple ones of the tack arranged in a collated strip, the direction of feed of the strip through the hammer tacker being indicated by the left arrow;

FIG. 7b is a side view of FIG. 7a;

FIG. 8a is a top plan view of a strip of band sheet metal in the process of indexing through a progressive punch press operation to produce a tacks in accordance with the invention, wherein the process in accordance with the invention further includes a step of collating the tacks in a strip for the tacker tool in accordance with the invention;

FIG. 8b is a sectional view taken along line VIIIB—VIIIB in FIG. 8a;

FIG. 8c is a perspective view of a collated strip of tacks in accordance with the invention inverted to show the nesting of the shank of a given tack into the slot of an adjacent tack;

FIG. 9a is a side elevational view of the punch dies of a progressive punch press machine for producing tacks in accordance with the invention;

FIG. 9b is top plan view of a matching die plate therefor;

FIG. 10a and 10b are a sequence of action views comparable to the side view of FIG. 2, except potions are broken away and other portions are shown in dashed lines in order that a tack driving-and-feed mechanism may be shown in solid lines, wherein:

FIG. 10a is a side view showing the tack driving-and-feed mechanism in a rest condition, as between uses, and, FIG. 10b is a comparable side view except showing the tack driving-and-feed mechanism in mid-cycle of a use;

FIG. 11 is a plan view (i.e., a bottom plan view) of FIG. 9, with portions broken away; and, FIGS. 12a through 15b are a series of sequence action views showing the coordinated movements between a tack-driving ram and a tack-feeding pawl of the hammer tacker, relative to a continuous succession of tacks in a strip, wherein:

FIG. 14b is a bottom plan view of FIG. 14a and shows the concurrent retraction of the pawl, FIG. 15a is a side view showing the ram at the limit of its drive stroke, which hence is mid-cycle for the mechanism as a whole, wherein an arrow in dashed lines shows the ram's reversal of direction as it begins its return stroke, and, FIG. 15b is a bottom plan view of FIG. 15a and shows the pawl at the beginning of its feed stroke;

DETAILED DESCRIPTION OF THE PREFERRED EMBODIMENTS

Figure 10B:
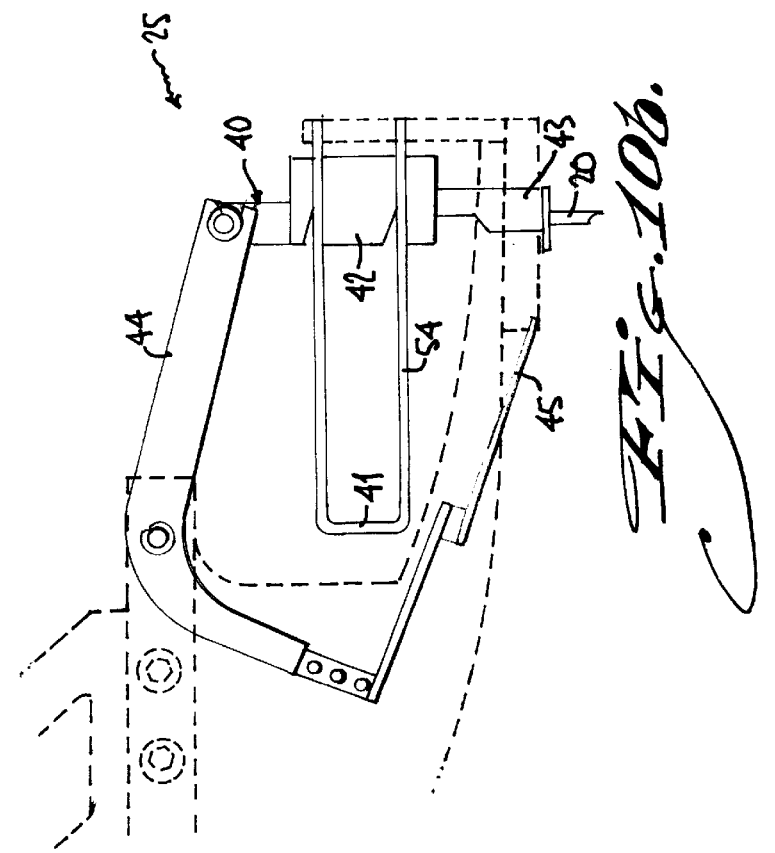

FIG. 1 shows a roofer tacking a row of shingles with fasteners or "tacks" 20 in accordance with the invention, using a hammer tacker 25 also in accordance with the invention. The term "tack" is used merely for convenience in this description over the more cumbersome term "fastener." Accordingly, use of the term "tack" herein does not limit the invention in a strict dictionary sense as a kind of "small nail" because, as described further below, this tack 20 is produced via a process unlike nails, from stock material unlike wire, to get an overall result that differs substantially from nails. Moreover, this tack 20 can be large or small.

FIG. 1 shows merely one example use (i.e., shingle laying) for the inventive tacks 20 and hammer tacker 25. Other example uses include without limitation drying in a roof with felt, or applying a house wrap (i.e., a vapor barrier) for exterior walls or also hanging dry wall or sheetrock for interior walls, and so on. Tacks 20 can be loaded in the hammer tacker 25 in coils 70 of sixty or seventy tacks or so (see, e.g., FIG. 4b). In use, the roofer pounds each tack 20 completely down with just one smooth blow of the hammer tacker 25, by swinging it approximately as shown.

To turn to FIGS. 2 and 3, the hammer tacker 25 comprises a main body 30 that comprises a funnel section 31 and a barrel section 32. The funnel section 31 has mounted to it a handle 33. The barrel section 32 terminates in an upstanding flange 34, including its extension(s) 36. The barrel section 32 includes a strike plate 37 through which the tacks 20 are expelled out (as will be shown and described further below).

The front flange and extension(s) 34 and 36 support a tack driving-and-feed mechanism 40, which includes, in its main aspects, a cantilevered leaf spring 41, a piston 42 held at the vibrating end of the leaf spring 41, a ram 43 extending down from the piston 42, and a rocker arm 44 actuated by the piston 42. The rocker arm 44 terminates in a pawl 45 (portions hidden from view) whose function is to feeds tacks under the ram 43 (as will be shown and explained further below).

With reference to FIG. 5, the cantilevered leaf spring 41 is shown in isolation. In relatively difficult technical language, it has what is termed a "double parallelogram" configuration. More plainly, the leaf spring 41 has a central fork 51 (comprising upper and lower arms 52 and 53) flanked by opposite outer forks 54. All the forks 51 and 54 extend from a common vertical web 56 (i.e., the vertical alignment being relative to how the spring 41 is oriented in the drawings). The central fork upper and lower arms 52 and 53 extend away from the central web 56 at an incline. In contrast, the outer forks 54 extend away from the central web 56 along a decline. Generally, the angle of inclination is comparable to the corresponding angle of declination. The outer forks 54 extend to ends which are anchored to the front flange and extension 34 and 36 (see FIG. 2). The central fork upper and lower arms 52 and 53 terminate in ends which bracket and hold the piston 42 (again, see FIG. 2). The piston 42 theoretically can vibrate up and down relative to its rest position, and between the outer forks 54. However, as the piston 42 is configured in this tack driving-and-feed mechanism 40, the piston 42's extreme up and down positions are limited by external stops, as will be described below.

Given the foregoing, this configuration for the spring 41 is advantageous because the spring 41 can be both relatively stiff and compact yet, in contrast, it can allow substantial travel of the piston 42 at the ends of the central fork arms 52 and 53. In effect, the spring 41 configured as it is, behaves comparably like a straight spring (not shown) having twice the length.

In the drawings from FIG. 2 onward, the hammer tacker 25 is shown with the piston 42 oriented for a downward power stroke along a generally vertical line of action. However, the hammer tacker 25 can be used for driving tacks 20 on inclined surfaces, as well as even overhead surfaces, and accordingly, terms like "vertical" or "up" and "down", or "clockwise" and "counterclockwise", "left" and "right" and so on, are used merely for convenience in this description (given the vantage point of the views), and do not limit the invention to a particular orientation or configuration, or otherwise.

The piston 42 is essentially a steel block having substantial inertial mass to actuate the tack driving-and-feed mechanism 40. The 43 ram is essentially a downward extension of the piston 42. The rocker arm 44 is C-shaped and is pivoted to the main body 30 by a pin 60. The rocker arm 44 has an upper prong 61 terminating in a sliding link connection 62 with the top of the piston 42. It also has a lower prong that is the pawl 45.

FIGS. 4a and 4b show the main body 30 in isolation. The main body 30 includes the funnel and barrel sections 31 and 32, and can be produced as an aluminum casting. However, other suitable materials and/or methods of fabrication are available and include without limitation machined steels, or composites of polymer or moldable resinous materials combined with cast or machined aluminum or metal. The funnel section 31 defines a tear-drop shaped cavity for a coiled strip 70 of tacks 20, as illustrated by FIG. 4b. In use, the tacks 20 unreel out of the funnel section 31 and advance along the barrel section 32 in the direction right to left in FIG. 4b. The funnel section 31 further includes a planar bracket portion 64 for mounting the handle 33 and the pivot pin 60 of the rocker arm 44 (see FIG. 2).

FIGS. 6a through 6c provide three views of a "tack" 20 in accordance with the invention. The tack 20 has a relatively broad flat head 66 that provides, in more technical language, a relatively large surface area. An advantage of a large surface area head 66 is that, it is highly effective for fastening soft, thin membrane-like materials to hard (typically) wooden structures or substrates. Example uses include without limitation, laying roof shingles or drying in a roof with felt, or applying a house wrap (i.e., the vapor barrier) or sheeting materials for exterior walls, as well as hanging dry wall or sheetrock for interior walls.

The tack 20 is preferably produced from relatively light gauge sheet metal via a process that includes a progressive die punch press, which lances the stock material and gives the tacks their form, as well as including, a collating machine or station, to arrange and interconnect the tacks 20 in indefinitely long strips. Every tack 20 has a shank 67 that is semi-cylindrical to improve stiffness, and pointed at the end to improve piercing. The broad head 66 of the tack 20 has a slot 68 extending to its center. Although the slot 68 actually represents the missing material that forms the shank 67, it has a practical purpose its own as a slot. With reference to FIGS. 7a and 7b, the slot 68 allows the shank $67^{-1}$ of another like tack $20^{-1}$ to insert therein for collating in strips 70. The tacks $20$–$20^{-n}$ in strip 70 are preferably held together by a glue or like polymer or resinous adhesive. Other suitable methods include without limitation wire ties or spot welds and the like.

The tack 20 as shown in the drawings generally has a head 66 measuring one inch (twenty-five mm) square, with rounded corners, and a shank 67 extending down between about three-fourths an inch (nineteen mm) and seven-eighths an inch (twenty-two mm). The preferred gauge for the parent sheet metal might be between twenty and twenty-four gauge, although other sizes can be equally adapted for the purpose, to make larger or smaller, or stiffer or whatever, tacks 20 as desired. In FIGS. 7a and 7b, the tacks $20$–$20^{-n}$ as arranged in the strip 70 have about one-half inch (thirteen mm) spacing between each other. This strip 70 is preferably sufficiently flexible for coiling to load in the hammer tacker 25 that way (see FIG. 4b).

If the strip 70 in FIGS. 7a and 7b were loaded in barrel section 32 of the hammer tacker 25 (see, e.g., FIG. 4b), then the strip 70 would advance in the direction of the left arrow 69. In relative terms, the given tack head 66 has a leading edge 71 and a trailing edge 72 (in which is formed the slot 68). For any given tack (e.g., indicated by reference numeral 20) between one ahead (e.g., indicated by $20^{+1}$) and another trailing (indicated by $20^{-1}$), then, (i) the given tack 20's head 66's leading edge 71 overlies the head $66^{+1}$ of the tack $20^{+1}$ immediately ahead, and extends partly as far as the shank $67^{+1}$ on that tack $20^{+1}$, and, (ii) its head 66's trailing edge 72 underlies the head $66^{-1}$ of the tack $20^{-1}$ immediately trailing, wherein the shank $67^{-1}$ of the tack $20^{-1}$ immediately trailing just enters the slot 68 of the given reference tack 20.

FIGS. 8a through 9b show various aspects of the method in accordance with the invention for producing the tack 20 out of a continuous band 300 or sheet metal, including production thereof in collated strips 70. FIG. 8a represents an abbreviated description of one version of the method in accordance with the invention. FIGS. 9a and 9b show actual die punches and plates for a progressive press punch machine for producing the tacks 20. However, the methodology shown by FIG. 8a varies from the methodology shown by FIGS. 9a and 9b in minor matters addressed more particularly below.

With reference to FIG. 8a, a continuous band of sheet metal is indexed progressively through various workstations indicated as 311–315, during which specific forming operations are executed. The band 300 has a nominal width of one inch (2.54 cm). The band 300 is advanced incrementally or indexed in the direction of arrow 302. The band 300 can be subdivided from the tack 20 at its extreme end into a succession of virtual workpieces $200^{-1}$ through $200^{-4}$ which are nominally one inch square. The band is indexed through the various workstations 311–315 in one-inch increments such that each virtual workpiece $200^{-4}$ through $200^{-1}$ and 20 is incrementally indexed through each station.

More particularly, the first station 311 involves impressing into virtual workpiece $200^{-4}$ a semi-cylinder shape 307 which ultimately will become the shank 67 of the completed tack 20. The semi-cylinder shape 307 is optional and assists the shank 67 in more buckling resistant through stiffening the shank 67. The next station 312 in succession involves shearing out the outline of the shank 67 in virtual workpiece $200^{-3}$. At the following station 313 the shank 67 in workpiece $200^{-2}$ is pre-bent to a shallow angle (i.e., into the view) to prepare the root of the shank 67 for full bending to a right angle. Station 314 involves completion of bending the shank 67 in workpiece $200^{-1}$ to its fully extended or right angle position. A tack 20 is ultimately sheared off the band 300 at station 315 where the sharp corners are broken off to give the head 66 its outline as shown, wherein the slot 68 is left behind by virtue of the bent-down shank 67.

The sheared off tack 20 is dropped down to a collating station 304. The tacks 20 advance through the collating station in the direction of arrow 306. The direction of advance 306 through the collating station 304 is co-axial with the orientation of the slot 68 of tack 20 at workstation 315. As shown, the direction of advance 302 of the band 300 is changed 135° clockwise relative to the direction of advance 306 through the collating station 304.

The strip of tacks 70 are spaced such that a given tack 20 is about one-half inch (13 mm) behind the adjacent tack $20^{+1}$ immediately ahead. As FIG. 8c shows, a given tack 20 has its shank 67 nested in the slot of the tack $20^{+1}$ immediately ahead. Returning to FIG. 8a, it shows that the head 66 of the given tack 20 rests upon and partially overlaps the head of the tack $20^{+1}$ immediately ahead. FIG. 8b likewise shows the matter of the overlapping heads for tacks 20 and $20^{+1}$. FIG. 8b also shows that the polymeric film 308 wraps around as shown both of the heads of the tacks 20 and $20^{+1}$.

A strip of a polymeric film 308 is applied to cover all the heads 66 of the tacks 20 in the tack strip 70. The polymeric film includes an adhesive (not illustrated). To cure the adhesive, the strip of tacks 70 along with the uncured film 308 has to be heated to a temperature around 280° F. (140° C.), which can be accomplished by radiant or convective heaters as is routinely known in the art. After curing the film 308, the tacks 20 are sufficiently affixed in the side by side relationship shown by the collated strip 70, until a force exerted by the tacker tool 25 breaks away the lowest tack in the collated strip 70 (see, e.g., FIGS. 10b and/or 14a and 15a).

With reference now to FIGS. 9a and 9b, a real world example is shown how to accomplish the results illustrated by FIG. 8a. FIG. 9a shows a set 320 of die punches 328–335 for use in a progressive punch press machine (not shown). FIG. 9b shows the corresponding die plate 340. The die punches 328–335 move in unison in a stroke comprising extension (in the direction indicated by arrow 322) and retraction (in the direction indicated by arrow 324). The die plate 340 is stationary. Across the top of the die plate 340 the band stock 300 of sheet metal advances in incremental starts and stops in the direction of arrow 302. The die plate is sub-dividable, beginning at the end workstation 344, into incremental workstations $344^{-4}$ through $344^{-9}$.

The progressive stations comprise the following. The station referenced as $344^{-9}$ is included for reference purposes as the station $344^{-9}$ which immediately precedes the first operative station. The successive station $344^{-8}$ is thus the first operative station, and it involves a punch by a pilot die 328 into cavity 348, as well as a stress-relieving notch by punch die 329 into cavity 349. Succeeding station $344^{-8}$ is an indexing station wherein pilot locator 330, the longest prong of the set 330, inserts into cavity 350. The following station $344^{-7}$ involves die punch 331 and cavity 351 forming a second stress-relieving notch.

The two stress-relieving notches (e.g., as formed by cavities 349 and 351) cooperatively frame the pointed end of the tack shank before the outline of the tack shank is lanced in the band 302. In fact, the outline of the tack shank is lanced by punch die 332 and cavity 352 from the edge of the band 302 to the root of the shank in the center of the tack head. An inventive aspect is that the orientation of the shank outline 352 on the band 302 aligns on one-half of a diagonal of the square (i.e., for a view of the "square," refer to $200^{-1}$ through $200^{-4}$ in FIG. 8a). This orientation optimizes the length of the tack shank relative to the tack head provided that the root of tack shank originates near a center of the tack head.

The next station $344^{-5}$ involves punch die 333 and cavity 353 forming a stiffening "pleat" or semi-cylinder roll in the tack shank to make it more resistant to buckling. Finally, station $344^{-4}$ involves punch die 334 and cavity 354 bending the tack shank to it fully extended, straight out position relative to the tack head (e.g., see tack 20 and shank 67 in FIGS. 6a or 6c). From there, the sheet metal band 302 is indexed forward three increments before another operation is executed on it to provide clearance for the outfeed from station 344 of the completed tack (not shown) to the collating station (see 304 in FIG. 8a). At station 344, a completed tack (i.e., see 20 in FIG. 8a) is punched free from the sheet metal band 302 by cylindrical die punch 335 and cavity 355. The die punch 355 has a nominal diameter of 1.3 inches (thirty three mm), which effectively breaks the sharp corners of the otherwise nominally square tack head. The die plate 340 includes slot 356 extending between cavities 354 and 355 to allow sliding passage of the tack shank therethrough (not shown).

With joint reference to FIGS. 9b and 8a, the completed tack (tack 20 at station 315 in FIG. 8a) is pushed through cavity 355 (FIG. 9b) to rest at a plane below the top surface of the die plate 340, for advancement to and through the collating station 340 along direction arrow 306. The die plate 340 extends cantilevered at station 344 to allow descent and removal of the completed tack along direction of advance 306. Also, the die plate 340 is formed with fence 357 to facilitate removal of the completed tack underneath the die plate 340 along direction of advance 306. It can now be seen that the reason station $344^{-4}$ is spaced three index increments away from final station 340 is to allow clearance of fence 357 below the top plane of the die plate 340.

Given the foregoing as shown by FIGS. 8a through 9b, the method in accordance with the invention allows endless production of collated strips 70 of tacks 20 for use in the tacker tool 25 in accordance with the invention.

Figure 10A:
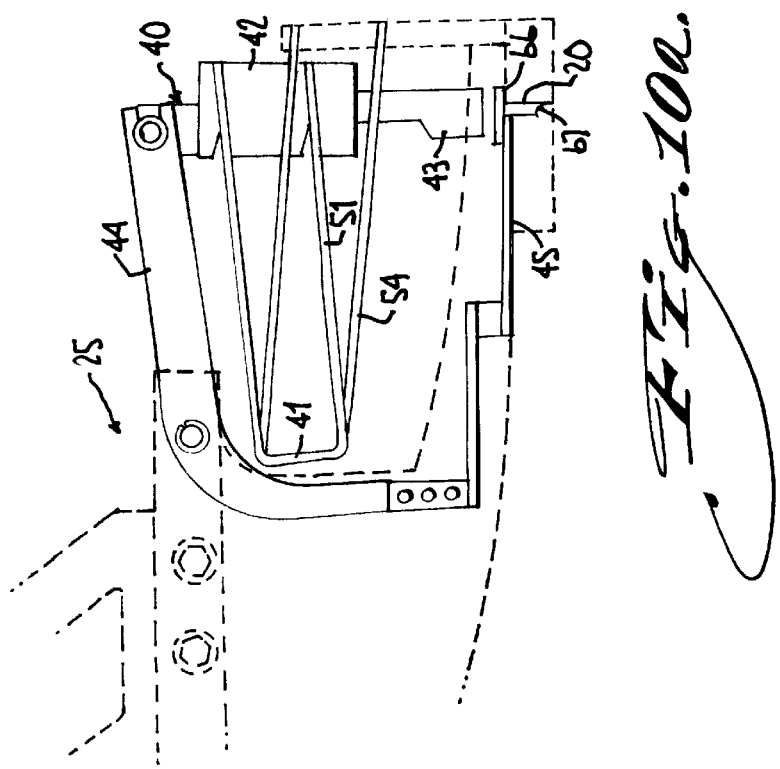

To turn now to matters more particularly concerning the tacker tool 25, FIGS. 10a and 10b collectively illustrate the piston 42's two-stroke cycle. FIG. 10a shows the piston 42 in a rest (or in its extreme retracted) position, as between uses. The rocker arm 44 is likewise in its rest position, which is also its extreme counterclockwise position. The ram 43 is at rest hovering slightly above the head 66 of tack 20 immediately below, which will be the first tack expelled out on the next use. The pawl 45 is wedged in a crotch of the tack 20, which crotch is defined between its head 66 and shank 67. FIG. 10a shows how matters appear as when, for example, and with reference to FIG. 1, a user of the tool 25 is on his or her back swing with the it.

FIG. 10b shows the piston 42 at mid-cycle. In contrast to FIG. 10a, what FIG. 10b shows is how matters appear at about the instant the user has pounded the tool 25 against the target surface, although this is not shown. The piston 42 has just completed its drive stroke, and shall shortly reverse directions and begin its return stroke. The user's downswing of the tool 25 gave the piston 42 much momentum. When the user finally lands the tool 25 on the target surface, the tool 25 comes to a sudden halt (recoil excepted), but the piston 42's inertial momentum propels it downward in opposition to the stiff resiliency of the spring 41. A user who gives the tool 25 a sufficient pounding also gives the piston 42 sufficient inertial force to both overcome the opposition of the spring 41 and also to pound the tack 20 completely into a target material or structure.

Accordingly, in FIG. 10b, the piston 42 is limited out in its extreme down or extended position. The cantilevered spring 41 is collapsed such that its three sets of forks 51 and 54 (only right outer fork 54 in view, the outer fork and central fork 51 being hidden directly behind the right outer fork, and see FIGS. 5 or 10a for 51), which are splayed apart in divergent planes as shown in FIGS. 5 or 10a, are coplanar in generally horizontal planes (i.e, the horizontal reference being relative to how the tool 25 is oriented in FIG. 10a). The rocker arm 44 is in its extreme clockwise position such that it has retracted the pawl 45 out from harms way of expelled tack 20. The ram 43 has explosively expelled or thrust the tack 20 straight down, sufficiently to plunge the tack 20 into at least a substantially hard material such as plywood, particle board, or wooden beams and rafters and the like. Following FIG. 10b, the piston 42 will reverse directions and return to its rest position as shown by FIG. 10a.

Figure 11:
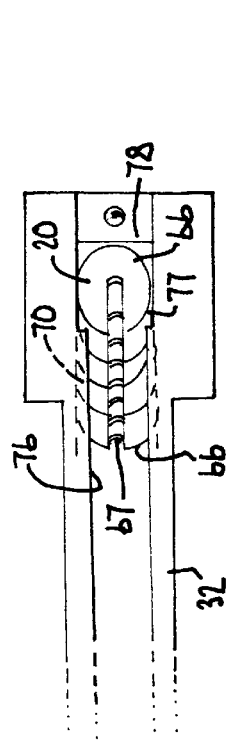

FIG. 11 shows the barrel section 32 of the main body 31 in a bottom plan view, except that the pawl 45 has been removed for clarity's sake. The barrel portion 32 includes a feed track 76 for transporting the strip 70 of tacks as the tacks 20 are advanced toward a final position in the feed track 76 underneath the ram (not in view). The feed track 76 comprises a T-shaped slot (not in view) in which the tacks 20 are carried by their heads 66, and in which their shanks 67 are free to dangle, uninvolved with the feed track 76. The feed track 76 terminates in an outlet 77 that is an enlargement in the T-slotted feed track 76. The terminus of the feed slot 76 is defined by a stop surface 78. The stop surface 78 limits the forward advance of the lead tack 20 in the strip 70. The outlet 77 allows clearance for the head 66 of the lead tack 20 to drop out of feed track 76 when thrust out by the ram (see 43 in FIG. 10b).

FIGS. 12a through 15b are a series of sequence action views that show the coordinated movements between the tack-driving ram 43 and tack-feeding pawl 45 relative to one use of the hammer tacker 25 (i.e., one stroke of the piston 42). In FIGS. 12a through 15b, the majority of the structure of the hammer tacker 25—excluding the ram 43 and the pawl 45 and some guides—are removed from the views for clarity. Three tacks 20, $20^{-1}$ and $20^{-n}$ are shown as representative of an indefinitely longer strip 70. The tacks 70 are assumed to be supported by the overhead feed track (see 76 in FIG. 11) for intersection with the line of action of the ram 43, as shown. During one cycle or use of the tool 25, the ram 43 will impact and expel a lead tack 20 out of the tool 25, and the pawl 45 will retract to latch onto a next tack $20^{-1}$ and feed it under the ram 43 for a next cycle.

Figure 12A:
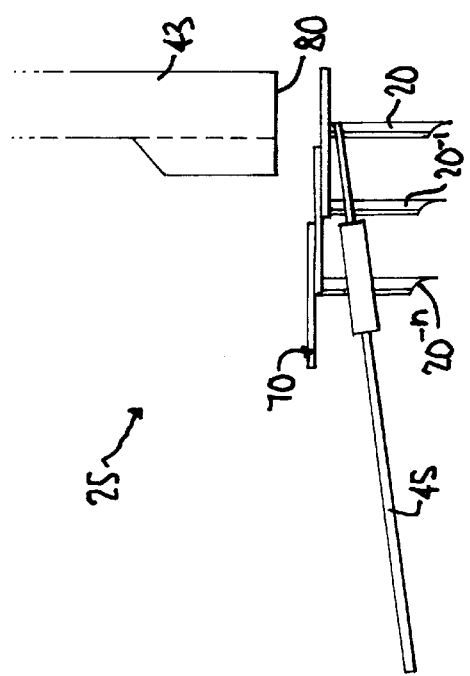
FIG. 12a is a side view showing the ram and pawl in a rest position, as between uses.

FIG. 12a is a side view showing the ram 43 and pawl 45 in a rest position, as between uses, and which corresponds to FIG. 10a. The strip of tacks 70 consists of a lead tack 20 at the extreme right (that is, extreme right relative to the vantage point of FIG. 12a), a next tack $20^{-1}$ in succession and to the immediate left of the lead tack 20, and then another or many more subsequent tacks in an indefinitely long strip extending to the left (although only one more is shown and is indicated as $20^{-n}$). The lead and next tacks 20 and $20^{-1}$ have their heads overlapped such that, the lead tack 20's head underlies the next tack $20^{-1}$'s head. That way, the lead tack 20 is free for downward expulsion without carrying the next tack $20^{-1}$ with it.

The pawl 45 is formed from an elongated stock of spring steel. FIG. 12a shows that the pawl 45 is resiliently applying a slight upward force on the bottom of the lead tack 20's head. The tacks in the strip 70, however, are all interconnected together by glue or the like. Thus the lead tack 20 is stable as shown in FIG. 12a because of its interconnection with the next tack $20^{-1}$, and it is therefore not gaining any meaningful support from the pawl 45. In fact, the depiction in the drawings of the pawl 45 operating between the lead and next tacks 20 and $20^{-1}$ only is used merely for convenience in this description, as the pawl 45 could be shortened and arranged to operate between, say for example, the seventh and eighth tacks behind the lead tack 20 (this is not shown). Accordingly, the depiction of the pawl 45 operating between the lead and next tack 20 and $20^{-1}$ only, is given as a non-limiting example and therefore does not limit the pawl 45 from being reconfigured to operate on tacks substantially trailing the lead tack 20.

Figure 12B:
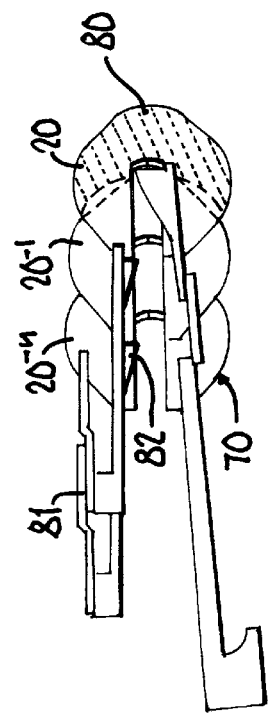
FIG. 12b is a bottom plan view of FIG. 12a, FIG. 13a is a side view showing the ram landing on the head of a lead tack, the ram consequently being part way into its drive (downward) stroke.

The ram 43 has a impact surface 80 given a shape which, in FIG. 12b, is indicated by dashed-line shading visible through the lead tack's 20 head 66. The impact surface 80 is given this shape so that it lands on only that much of the lead tack 20's head which appears underneath from the next tack $20^{-1}$. The ram 43 generally has a matching cross-sectional shape to allow it to closely surround the next tack $20^{-1}$'s head's leading edge as the ram 43 moves vertically thereby (see FIG. 14a).

FIG. 12b shows a pair of cantilevered guide arms 81 which are anchored to the barrel section of the main body (not shown, but see 33 and 30 in FIG. 11), and extend to ends formed with cam surfaces 82. The cam surfaces 82 give guiding support to the shanks of the tacks 20 as they move by. The cams 82 help true the alignment of the shanks and hence true the alignment of the heads of the tacks 20 in the overhead feed track (not shown, but see 76 in FIG. 11). These guide arms 82 are optional and to date, it is indeterminate if they adequately perform any surface which justifies their continued use.

Figure 13A:
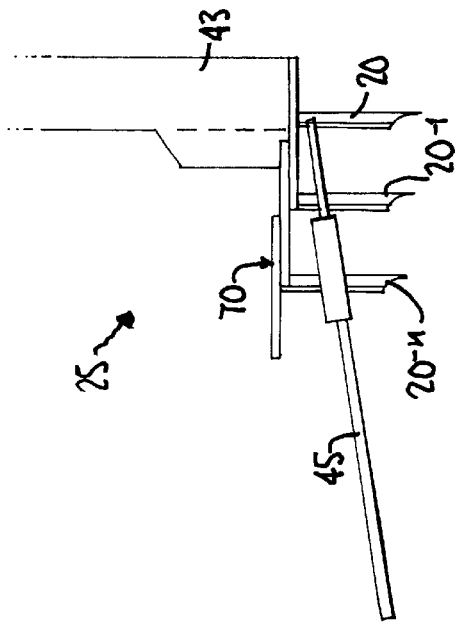
FIG. 13b is a bottom plan view of FIG. 13a, FIG. 14a is a side view showing the ram midway down in its drive stroke.
Figure 13B:
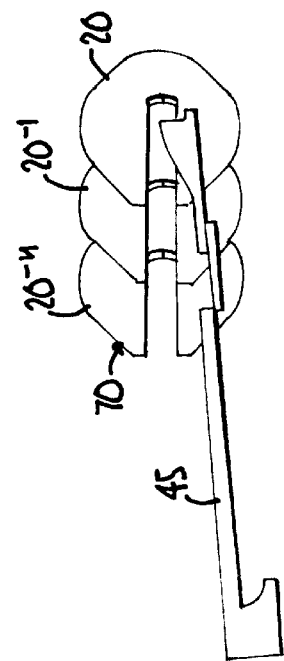

FIG. 13a is a side view showing the ram 43 contacting the head of the lead tack 20. The ram 43 consequently is, part way into its drive (downward) stroke. FIG. 13b is a bottom plan view of FIG. 13a and shows that the pawl 45 has not yet begun its retraction stroke. If it remains static as shown, the pawl 45 will be in harm's way as the ram 45 forcibly expels and plunges the tack 20 into a wooden target surface.

FIG. 14a is a side view showing the ram 43 midway down into its drive stroke. The ram 43's scalloped cross-sectional shape allows the ram 43 to slide by the next tack $20^{-1}$ without dragging it downwardly with the lead tack 20. The pawl 45 is moving or retracting to the left in FIG. 14a, but it has not yet cleared the lead tack 20's head's trailing edge. As previously mentioned, the pawl 45 is springy. Its inherent resiliency urges the pawl 45 upward to remain in contact with the lead tack 20. As also shown in FIG. 14b, the pawl 45 is urged to remain abutting against the shank of the next tack $20^{-1}$ as it retracts. The pawl 45 has a terminal end which comprises a flared section 85 terminating in an impulse surface 86, one side of which is formed with a catch 87. The pawl 45 is shown retracting such that its flared edge 85, while urged against the next tack $20^{-1}$'s shank, moves the pawl 45 outboard relative to the forward advance of the tack strip 70.

FIG. 15a is a side view showing the ram 43 at the end of its drive stroke. The position of the ram 45 corresponds to the mid-cycle for the piston and the tack driving-and-feed mechanism as a whole (not shown, but see 42 and 40 in FIG. 10b). An arrow in dashed lines shows the ram 43's reversal of direction as it begins its return stroke. The pawl 45 is clear of the lead tack 20's trailing edge and has sprung up to wedge itself in the crotch of the next tack $20^{-1}$ (i.e., between the next tack $20^{-1}$'s head and shank). FIG. 15b shows that the pawl 45's flared edge 85 is clear of the next tack $20^{-1}$'s shank. Thus the pawl 45 has concurrently sprung—not only up, but also—inboard, until the impulse surface 86 and catch 87 rest against the next tack $20^{-1}$'s shank. From this extreme retracted position for the pawl 45, it reverses direction and moves to the right in FIG. 15b. It thus is at the beginning of its feed stroke, and will continue moving to the right until it rests in its start position as shown by FIG. 12b. The next tack $20^{-1}$ will have advanced to the "lead tack position," and the tack trailing $20^{-n}$ the next rack will take the "next tack position."

It will be noted that, the pawl 45 advances the strip of tacks 70 by pushing against the shank of a given tack $20^{-1}$ (it need not be limited to the second tack in turn for expulsion, as shown in the drawings). In the strip 70, all the tacks (e.g., $20^{-n}$) trailing the pawl-engaged tack (e.g., $20^{-1}$) are pulled, and all the tacks (if any, none shown) ahead of the pawl-engaged tack $20^{-1}$ are pushed:—all at the same time, one incremental position forward. The interconnections between the tacks must be sufficiently strong so as not to sever when pulled, because that will break the strip, or not to compress when pushed, because that will stack the tacks in the feed track and consequently jam the feed track. In addition, the interconnections should be sufficiently flexible to allow the strip of tacks to coil. It is presently preferred if these interconnections are achieved by glue or adhesives, however other suitable methods include without limitation spot welds and/or wire ties.

Figure 16:
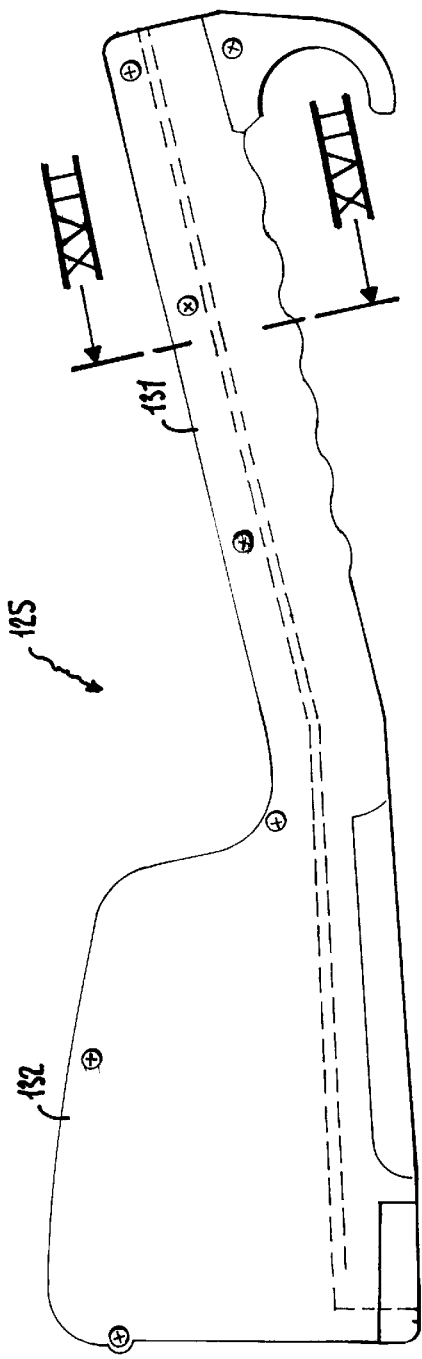
FIG. 16 is a side elevational view of an alternate version of a hammer tacker in accordance with the invention, comparable to FIG. 2 except excluding the magazine for a coiled strip.
Figure 18:
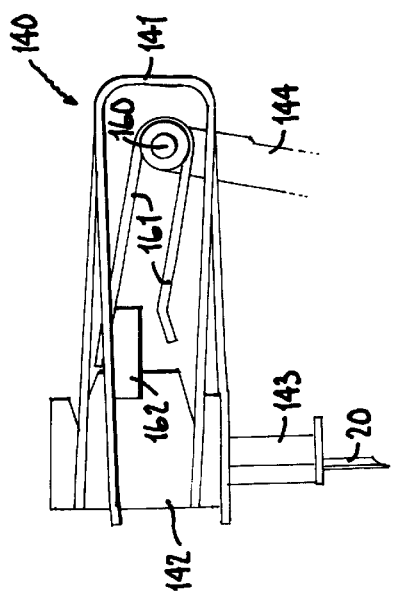
FIG. 18 is a side elevational view comparable to FIG. 10a, except showing the tack driving-and-feed mechanism of the FIG. 16 version of the hammer tacker, in which the tack driving-and-feed mechanism is shown in a rest condition, as between uses.
Figure 17:
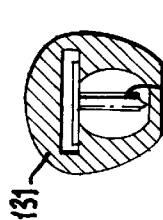
FIG. 17 is a sectional view taken along line XVII—XVII in FIG. 16.

FIG. 16 is a side elevational view of an alternate version of a hammer tacker in accordance with the invention, comparable to FIG. 2 except excluding the magazine for a coiled strip;

FIG. 17 is a sectional view taken along line XVII—XVII in FIG. 16; and,

FIG. 18 is a side elevational view comparable to FIG. 10a, except showing the tack driving-and-feed mechanism of the FIG. 16 version of the hammer tacker, in which the tack driving-and-feed mechanism is shown in a rest condition, as between uses.

FIG. 16 shows an alternate version 125 of the tacker tool in accordance with the invention. The tacker tool 125 comprises a main body having a handle section 131 and a head section 132. FIG. 17 shows that the handle section 131 is substantially hollow and functions as a magazine and slideway for a collated strip 70 of tacks 20. The head section 131 houses a tack driving-and-feed mechanism 140 (see FIG. 18), which is comparable in most aspects to the tack driving-and-feed mechanism shown by FIGS. 10a through 15a.

More particularly, FIG. 18 shows that the tack driving-and-feed mechanism 140 comprises a cantilevered leaf spring 141, a piston 142 held at the vibrating end of the leaf spring 141, a ram 143 extending down from the piston 142, and a rocker arm 144 having an upper prong 161 actuated by the piston 142. The rocker arm 144 and its upper prong 161 are fixed relative to each other in a right angle configuration as shown, to pivot via pivot pin 160 inserted at the corner thereof. The rocker arm 144 extends out of view to terminate in a pawl (not shown, but see pawl 45 in FIGS. 10 and 10b) whose function is to feed tacks 20 under the ram 143 (as previously shown and explained in connection with FIGS. 12a through 15b). The cantilevered leaf spring 141 has the same "double parallelogram" configuration as shown by FIG. 5.

In comparing FIG. 18 with FIG. 2, the differences between the FIG. 2 version 40 and FIG. 18 version 140 of the tack driving-and-feed mechanism include the following. In FIG. 18, the rocker arm upper prong 161 is split with two fingers disposed on opposite sides of the sliding link connection 162 on the piston 142. Whereas FIG. 2 shows an ordinary sliding link connection 62, FIG. 18 shows a hybrid connection 161/162 between a sliding link connection and a lost motion connection. Also, the pivot connection 160 for rocker arm 144 (e.g., see FIG. 18) is aligned in a substantially different position relative to pin 60 in FIG. 2. Despite physical rearrangement of the matters mentioned above, the operative aspects of the tack driving-and-feeding mechanism 140 remain essentially the same.

Inventive aspects of the FIG. 16 version 125 of the tacker tool include the following. The collated strip 70 of tacks 20 is stored in the handle section 131 and fed in more a straight line arrangement to the head section 132. Hence there is not as much tension between adjacent tacks tending to pull them apart in the collated strip. The handle section 131 holds a collated strip comprising about thirty-six fasteners. However, refilling the handle section 131 with a fresh strip 70 of thirty-six tacks is simple because the aft-end of the handle section 131 is open. This allows quick insertion and sliding in of a fresh strip 70 of tacks for re-filling the tacker tool 125 for renewed use.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A plurality of tacks collated together in a strip in a side by side relationship for use in a tacker tool, a given tack comprising:

a sheet metal head; and a shank lanced out of the sheet metal head and bent relative to the head to leave a slot in the head extending from approximately a center of the head to a portion of the peripheral edge thereof;

the slot being of a width sufficient to receive the shank of an adjacent tack in a side by side relationship wherein the heads of said given tack and said adjacent tack overlap such that one head occupies a relatively lower position as the other head occupies a relatively upper position; and, disengagement-preventing means for preventing disengagement between said given tack from its side by side relationship with the adjacent tack until a force is exerted on the head of a tack positioned at the lowest level in the collated strip.

2. The collated tacks of claim 1 wherein the disengagement-preventing means comprises an unbroken strip of adhesive material applied directly to the heads of the tacks in the collated strip, an incremental portion of which breaks away with said tack positioned at the lowest level in the collated strip at the instance of the exerted force.

3. The collated tacks of claim 1 wherein the side by side relationship is characterized in that, the heads of the tacks are nominally square and the spacing between shanks of side by side tacks is about half a side of the square.

4. The collated tacks of claim 3 wherein each head is nominally about one-inch square and the spacing between shanks is about ½-inch.

5. The collated tacks of claim 1 wherein the side by side relationship is characterized in that, the head of each tack is nominally a circle and the spacing between shanks of side by side tacks is about half the diameter of the circle.

6. The collated tacks of claim 5 wherein each head is nominally 1.3 inches-diameter and the spacing between shanks is about ½-inch.

7. The collated tacks of claim 1 wherein the head is nominally given the shape of a square and the shank is formed from a portion of the square such that it has an origin in the center of the square and extends along and generally is co-extensive with one-half of one diagonal.

8. The collated tacks of claim 1 wherein the shank of the given tack includes a buckling-resistant formation to stiffen it.

9. A method of producing from a stock of band sheet metal, a plurality of tacks collated together in a strip in a side by side relationship for use in a tacker tool, the method comprising:

indexing one end of said stock of band sheet metal into a workstation wherein a virtual tack head is definable on the band;

lancing the outline of shank in the virtual tack head wherein the shank has a root origin generally at a center of geometry of the virtual tack head;

deflecting the shank into an extended position, wherein the shank leaves behind a slot in the virtual tack head;

separating the virtual tack head from the stock band material to produce the given tack, and, feeding the given tack to a collating station;

repeating the foregoing to produce a successive tack;

collating the given and successive tacks in a side by side relationship including nesting the shank of the successive tack into the slot of the given tack such that the head of the given tack occupies a relatively lower position than the head of the successive tack;

adding disengagement-preventing means for preventing disengagement between the given tack from its side by side relationship with the successive tack until a force is exerted on the head of a tack positioned at the lowest level in the collated strip; and, repeating the foregoing, indefinitely, to produce the collated strip of tacks.

10. The method of claim 9 wherein the workstation comprises a plurality of stations in a progressive punch press machine.

11. The method of claim 9 further comprising a step of forming the shank with a buckling-resistant stiffening formation.

12. The method of claim 9 wherein the step of feeding the given tack to a collating station further comprises feeding the given tack without rotating its head in a direction to and through the collating station which is substantially co-axial with the slot.

13. A method of producing from a stock of band sheet metal, a plurality of tacks collated together in a strip in a side by side relationship for use in a tacker tool, the method comprising:

indexing one end of said stock of band sheet metal into a workstation wherein a square virtual workpiece is definable on the band;

lancing the outline of a shank in the virtual workpiece wherein the shank has a root origin generally at a center of the square, and extends along and is generally co-extensive with one-half of one diagonal of the square;

deflecting the shank into an extended position, wherein the shank leaves behind a slot in the virtual workpiece;

separating the virtual workpiece from the stock band material to produce the given tack which includes a tack head in which said slot is formed;

feeding the given tack without rotating its head to a collating station in a direction substantially co-axial with said slot;

repeating the foregoing to produce a successive tack;

collating the given and successive tacks in a side by side relationship including nesting the shank of the successive tack into the slot of the given tack such that the head of the given tack occupies a relatively lower position than the head of the successive tack;

adding disengagement-preventing means for preventing disengagement between the given tack from its side by side relationship with the successive tack until a force is exerted on the head of a tack positioned at the lowest level in the collated strip; and, repeating the foregoing, indefinitely, to produce a collated strip of tacks.

14. The method of claim 13 wherein the workstation comprises a plurality of stations in a progressive punch press machine.

15. The method of claim 13 wherein the step of indexing the stock of band sheet metal includes indexing the band along an indexing direction, the indexing direction and feeding direction to and through the collating station being 135° apart.

* * * * *